United States Patent [19]

Wehle

[11] Patent Number: 4,533,425
[45] Date of Patent: Aug. 6, 1985

[54] APPARATUS FOR SECURING A VALVE TO A WRAPPER SLEEVE

[75] Inventor: Peter Wehle, Neuhausen am Rheinfall, Switzerland

[73] Assignee: SIG Schweizerische Industrie-Gesellschaft, Neuhausen am Rheinfall, Switzerland

[21] Appl. No.: 505,398

[22] Filed: Jun. 17, 1983

[30] Foreign Application Priority Data

Jun. 18, 1982 [CH] Switzerland .................. 3781/82

[51] Int. Cl.³ .................. B29D 23/10; B65H 1/16
[52] U.S. Cl. .................. 156/466; 156/514; 156/552; 156/569; 156/580.1; 493/213; 493/302
[58] Field of Search ............... 156/466, 514, 552, 569, 156/573, 513, 580.1; 493/213, 288, 302

[56] References Cited

U.S. PATENT DOCUMENTS 1,135,513  4/1915  Forrester .................. 156/569
3,909,340  9/1975  Solbeck .................. 156/552
4,055,032 10/1977  Hammond .................. 156/514

FOREIGN PATENT DOCUMENTS 2159157  5/1973  Fed. Rep. of Germany .
1903048  5/1976  Fed. Rep. of Germany .
2848834  5/1980  Fed. Rep. of Germany .

Primary Examiner—Michael Wityshyn
Attorney, Agent, or Firm—Spencer & Frank

[57] ABSTRACT

An apparatus for consecutively applying relief valves to a wrapper sheet fed to the apparatus comprises a chute defining a substantially vertically oriented inner track for receiving the valves in a series; a channel introducing the valves into the track; a retainer for alternatingly holding back and releasing a momentarily lowermost valve in the track; a valve advancing mechanism for intermittently causing the momentarily lowermost valve to clear the retainer; a welding device situated below the retainer adjacent the chute externally thereof for cyclically bonding a valve to the wrapper sheet; and a positioning device situated underneath the retainer for aligning the valve released by the retainer with the welding device. The wrapper sheet passes between the positioning device and the welding device. The apparatus also has a cutter for cyclically providing an opening in the wrapper sheet at the intended location of the valves.

4 Claims, 3 Drawing Figures

APPARATUS FOR SECURING A VALVE TO A WRAPPER SLEEVE

BACKGROUND OF THE INVENTION

This invention relates to an apparatus for securing a valve to the inside of a wrapper sleeve in a production line operation. The wrapper sleeve has at least one thermoplastic layer, and the apparatus includes a welding device as well as a mechanism for guiding the individual valves to the welding device.

Certain wrapped contents generate gases which, in case the wrapper is airtight, cause an excessive pressure that may result in an undesired inflation of the package. It has been known to provide gastight bags with a relief valve (excessive pressure valve) through which the gas may escape from the bag. Such valves are disclosed, for example, in German Auslegeschrift (Application Published after Examination) No. 1,903,048 or German Offenlegungsschrift (Application Published without Examination) No. 2,848,834.

While the valve, according to the Auslegeschrift, is secured to the inside of the bag wall and projects through a circular opening in the wall only with a valve head portion, the valve disclosed in the Offenlegungsschrift is secured to the outside of the bag. In this last-named structure, as indicated by the Offenlegungsschrift, spacers are necessary to prevent damaging of the valve or an unintended opening thereof. It is a disadvantage of externally arranged valves that the risks of an accidental tearing-off of the valves are high; this would result in a hole in the package. This reason alone warrants the positioning of the valve inside the bag. The valve may be provided with devices which prevent particles of the packed goods from penetrating into the valve. If a circular opening in the bag can be dispensed with (for example, if a slot suffices), the movable flap above the valve aids in preventing dirt or other material from penetrating into the valve from the outside.

German Offenlegungsschrift No. 2,159,157 discloses a a valve secured to the inside of a bag. The valve is applied either after the bag has been formed or it is secured to the packing material when it is still in a sheet form. For applying the valve to the wrapper, there is provided a hole punching device and a heater (welder) arranged concentrically with the punching device. By means of a horizontally displaceable feeder, a valve is brought underneath the punched-out location and is subsequently welded to the bag material.

While securing valves to completed bags requires additional manual labor, an insertion of the valves into the sheet material before the bag is formed may occur in a production line operation as the sheet material of indefinite length is intermittently advanced. In the former case, it is a disadvantage that expensive manual labor has to be resorted to and in the latter case, that is, when the valve is already attached when the bag (sleeve) is formed, care has to be taken that the forming mandrel of the bag-making machine does not tear off the valves as the sheet material is pulled thereover. Further, the punching of circular openings involves the additional expense of providing for a suction removal of the punched-out waste.

SUMMARY OF THE INVENTION

It is an object of the invention to provide an improved apparatus of the above-outlined type with which valves may be secured to the inside of a tubular packing sleeve simultaneously with the forming of the sleeve from a wrapper web.

This object and others to become apparent as the specification progresses, are accomplished by the invention, according to which, briefly stated, the apparatus for consecutively applying relief valves to a wrapper sheet fed to the apparatus comprises a chute defining a substantially vertically oriented inner track for receiving the valves in a series; a channel introducing the valves into the track; a retainer for alternatingly holding back and releasing a momentarily lowermost valve in the track; a valve advancing mechanism for intermittently causing the momentarily lowermost valve to clear the retainer; a welding device situated below the retainer adjacent the chute externally thereof for cyclically bonding a valve to the wrapper sheet; and a Positioning device situated underneath the retainer for aligning the valve released by the retainer with the welding device. The wrapper sheet passes between the positioning device and the welding device. The apparatus also has a cutter for cyclically providing an opening in the wrapper sheet at the intended location of the valves.

DESCRIPTION OF THE PREFERRED EMBODIMENT

Figure 1:
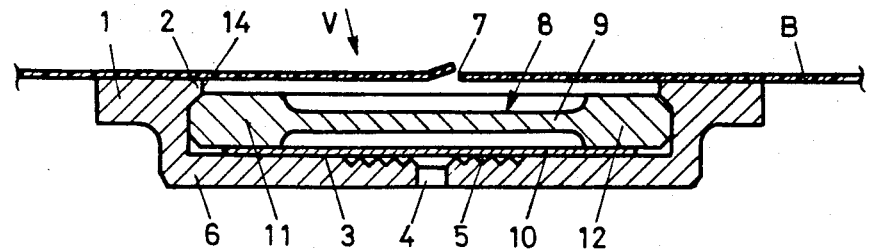
FIG. 1 is a cross-sectional view of a valve attached to the inside of a bag wall.

Turning now to FIG. 1, there is shown a typical bag valve V adapted to be applied to a bag wall B with an apparatus according to the invention.

The valve V comprises a circular carrier casing 6 which includes an outer flange 1 and a radially inwardly projecting annular bead 2 which bounds a circular depression 14 of the casing 6. The casing 6 is bonded, by an annular radial face of the flange 1, to the inside of a bag wall B. The casing 6 has a bottom 3 whose center is provided with a central opening 4 surrounded by concentric ribs 5 for preventing passage of solid particles. On the bottom 3 there is positioned a diaphragm 10. A clamping part 8 formed of a web 9 and pressing parts 11 and 12 is overlying the diaphragm 10 such that the pressing parts 11 and 12 each engage the diaphragm 10 along circular marginal portions thereof and a chamfered part of the annular bead 2.

A valve of the above-described type may be readily secured to a bag wall B without precise centering. Within the outline of the valve V the wall B is provided with an aperture formed by a slot 7.

Figure 2:
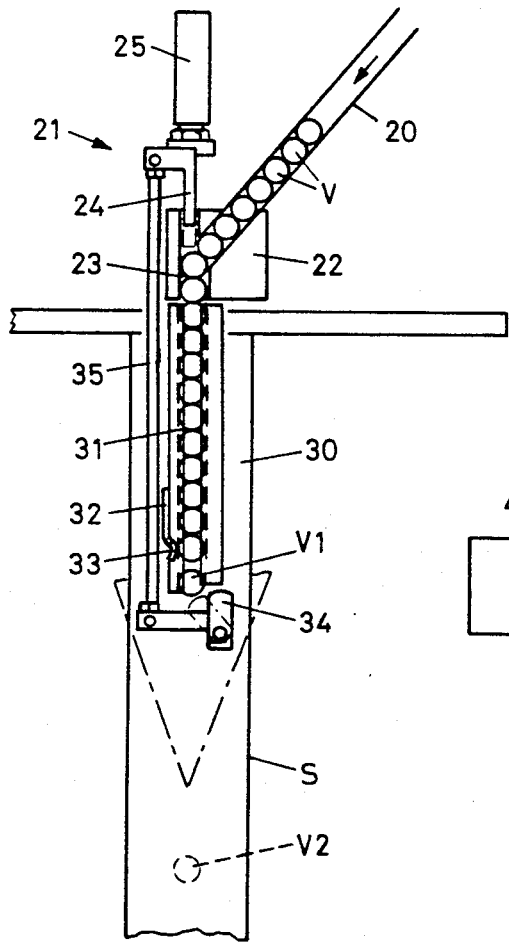
FIG. 2 is a schematic front elevational view of a preferred embodiment of the invention.
Figure 3:
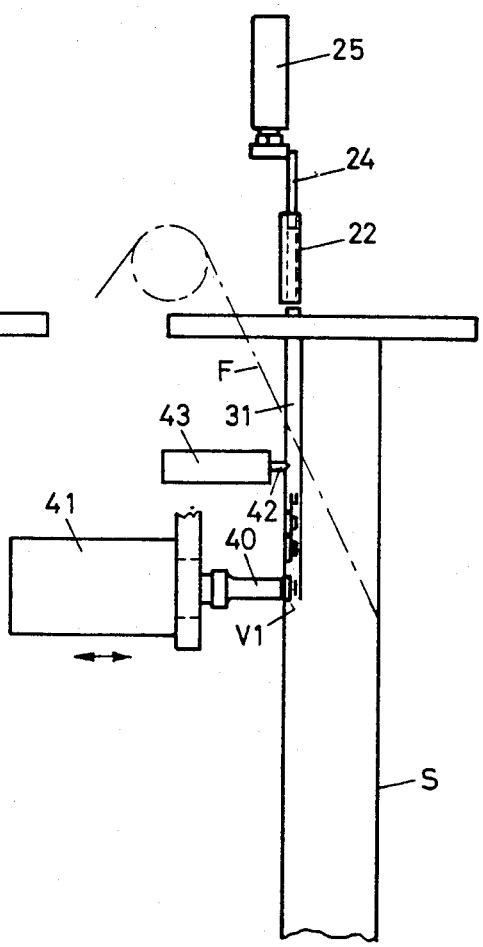
FIG. 3 is a schematic side elevational view of the structure shown in FIG. 2.

Turning now to FIGS. 2 and 3, there is shown an apparatus according to the invention for applying valves V 10 onto a wrapper sheet F as it is being shaped into a wrapper sleeve S about a mandrel (forming box) in a manner known by itself.

The valves V are aligned, in a manner not shown, to have the same orientation and are loaded into a supply channel 20. From the supply channel 20 the valves V are transferred into a charging device 21 which includes a guide block 22. In the guide block 22 there are provided a charging channel 23 oriented towards a chute 31 of a wrapper sleeve forming box 30 and a charging ram 24 which penetrates into the charging channel 23 and which is connected with a ram drive 25. The forming box 30 serves for forming a sleeve S from a packing sheet F taken from a sheet supply. In the chute 31 there is positioned a retaining leaf spring 32 provided with a cam portion 33 and at the end of the chute 31 there is arranged a pivotal release pawl 34.

The release pawl 34 is a pivotal lever which is coupled with the drive 25 of the ram 24 by means of an actuating rod 35. A sonotrode 40 of a supersonic welding device 41 is oriented towards the position which the release pawl 34 assumes when it is swung into the path determined by the chute 31. The swung-in position of the pawl 34 is shown in broken lines in FIGS. 2. The supersonic welding device 41 may be horizontally shifted and may be connected with the drive 25 by means of a lever. A slit punching knife 42 is situated above the supersonic welding apparatus 41 and is provided with its own drive 43.

In operation, the aligned valves V are held back in the supply channel 20 by the lowered plunger 24 (shown in broken lines in FIG. 2). When the ram 24 is raised by its drive 25, the leading valve V slides into the charging channel 23 provided in the guide block 22. By virtue of one stroke of the ram 24—one stroke length of the ram 24 corresponds to the diameter of one valve V—the entire row of valves V in the chute 31 are pressed downwardly and as a result, the lowest valve V in the chute 31 forces the retaining spring 32 out of the way and falls onto the release pawl 34 and is thus positioned by the latter. In this manner, a valve V1 is situated directly in front of the sonotrode 40 and may be welded thereby.

After the welding step, the drive 25 again raises the ram 24 and, with the intermediary of the connecting rod 35, pivots the pawl 34 clear of the chute 31 into the position shown in solid lines in FIG. 2. Thereupon the sleeve S may move one increment downward, until the subsequent sleeve area for a valve V is aligned with the sonotrode 40. Subsequently, the drive 25 again moves the ram 24 downward and pivots the pawl 34 into its operative, valve positioning state, ready to receive and position the next valve V dropping down from the chute 31. In FIG. 2, there is shown an earlier-applied valve V2 in the closed sleeve situated downstream of the forming box 30.

It will be understood that the above description of the present invention is susceptible to various modifications, changes and adaptations, and the same are intended to be comprehended within the meaning and range of equivalents of the appended claims.

What is claimed is:

1. An apparatus for consecutively applying relief valves to a wrapper sheet fed to the apparatus, comprising
   (a) a chute defining a substantially vertically oriented inner track for receiving the valves in a series;
   (b) channel means for supplying the valves to said chute and introducing the valves into said track;
   (c) retaining means for alternatingly holding back and releasing a momentarily lowermost valve in said track; said retaining means comprising a resilient cam engaging the momentarily lowermost valve in said track;
   (d) valve advancing means for intermittently causing the momentarily lowermost valve to clear said retaining means; said valve advancing means including a ram aligned with said track and a drive means connected to said ram for alternatingly advancing and withdrawing said ram; said ram being arranged for abutting a momentarily uppermost valve in said track for advancing the valve series in said track upon advance of said ram;
   (e) welding means situated below said retaining means adjacent said chute externally thereof for cyclically bonding a valve to the wrapper sheet;
   (f) positioning means situated underneath said retaining means for aligning the valve released by said retaining means with said welding means; said positioning means including a pivotal pawl having an operative position for abutting a valve passing beyond said retaining means and an inoperative position clear of a travelling path of the valves determined by said track;
   (g) connecting means operatively coupling said pawl to said drive means for moving said pawl into said operative position when said drive means advances said ram and for moving said pawl into said inoperative position when said drive means withdraws said ram;
   (h) web guiding means for passing the wrapper sheet between said positioning means and said welding means; and
   (i) cutting means situated above said welding means for cyclically providing an opening in the wrapper sheet at the intended location of the valves to be bonded thereto by said welding means.

2. An apparatus as defined in claim 1, wherein said retaining means comprises a bent leaf spring; said resilient cam forming part of said leaf spring.

3. An apparatus as defined in claim 1, wherein said ram has a stroke length substantially equalling a diametral dimension of the valves measured parallel to the direction of valve advance in said track.

4. An apparatus as defined in claim 1, wherein said chute forms part of a substantially vertically oriented forming box for shaping the wrapper sheet into a wrapper sleeve.

* * * * *